(12) United States Patent
Kohlstrung et al.

(10) Patent No.: US 11,578,181 B2
(45) Date of Patent: Feb. 14, 2023

(54) THERMALLY EXPANDABLE COMPOSITIONS

(71) Applicant: Henkel AG & Co. KGaA, Duesseldorf (DE)

(72) Inventors: Rainer Kohlstrung, Plankstadt (DE); Klaus Rappmann, Weinheim-Rittenweier (DE)

(73) Assignee: Henkel AG & Co. KGaA, Duesseldorf (DE)

(*) Notice: Subject to any disclaimer, the term of this patent is extended or adjusted under 35 U.S.C. 154(b) by 228 days.

(21) Appl. No.: 15/484,788

(22) Filed: Apr. 11, 2017

(65) Prior Publication Data

US 2017/0218155 A1    Aug. 3, 2017

Related U.S. Application Data

(63) Continuation of application No. PCT/EP2015/073139, filed on Oct. 7, 2015.

(51) Int. Cl.
| | |
|---|---|
| *C08J 9/00* | (2006.01) |
| *C08J 9/08* | (2006.01) |
| *C08L 33/06* | (2006.01) |
| *B29C 35/02* | (2006.01) |
| *C09J 5/06* | (2006.01) |
| *C09J 5/08* | (2006.01) |
| *C09J 123/08* | (2006.01) |
| *C08L 23/08* | (2006.01) |
| *B29K 23/00* | (2006.01) |

(52) U.S. Cl.
CPC ............. *C08J 9/0061* (2013.01); *B29C 35/02* (2013.01); *C08J 9/0023* (2013.01); *C08J 9/08* (2013.01); *C08L 33/06* (2013.01); *C09J 5/06* (2013.01); *C09J 5/08* (2013.01); *C09J 123/0853* (2013.01); *B29K 2023/083* (2013.01); *C08J 2201/024* (2013.01); *C08J 2201/026* (2013.01); *C08J 2203/02* (2013.01); *C08J 2207/02* (2013.01); *C08J 2323/08* (2013.01); *C08J 2423/08* (2013.01); *C08L 23/08* (2013.01); *C09J 2431/00* (2013.01); *C09J 2433/00* (2013.01)

(58) Field of Classification Search
CPC ...................................................... C08J 9/0061
See application file for complete search history.

(56) References Cited

U.S. PATENT DOCUMENTS

| | | | |
|---|---|---|---|
| 3,965,054 A | 6/1976 | Nojiri et al. | |
| 4,588,754 A | 5/1986 | Liu | |
| 4,692,473 A * | 9/1987 | Wright ....................... | C08J 9/08 428/314.4 |
| 4,806,294 A | 2/1989 | Lapierre et al. | |
| 4,892,691 A | 1/1990 | Kolossow | |
| 5,124,098 A | 6/1992 | Vischer | |
| 5,269,987 A * | 12/1993 | Reedy ....................... | C08J 9/127 264/50 |
| 5,274,006 A | 12/1993 | Kagoshima et al. | |
| 5,342,560 A | 8/1994 | Sturm et al. | |
| RE35,239 E | 5/1996 | Wason et al. | |
| 5,648,401 A | 7/1997 | Czaplicki et al. | |
| 5,925,450 A | 7/1999 | Karabedian et al. | |
| 5,932,691 A | 8/1999 | Khanin et al. | |
| 6,528,550 B1 | 3/2003 | Hsu et al. | |
| 6,617,295 B2 | 9/2003 | Nitzsche | |
| 7,271,202 B2 * | 9/2007 | Krabbenborg ............. | C08J 3/12 521/56 |
| 9,637,067 B2 | 5/2017 | Kohlstrung et al. | |
| 2002/0120024 A1 | 8/2002 | Koffler et al. | |
| 2004/0260012 A1 | 12/2004 | Krabbenborg et al. | |
| 2006/0189752 A1 * | 8/2006 | Krueger ................... | C08L 63/00 525/55 |
| 2008/0103221 A1 * | 5/2008 | Weinbeck .................. | C08J 9/04 521/79 |
| 2008/0265516 A1 | 10/2008 | Walker et al. | |
| 2009/0239962 A1 * | 9/2009 | Dobashi ................. | C08J 9/0061 521/95 |
| 2012/0247637 A1 | 10/2012 | Tanaka et al. | |
| 2013/0251925 A1 * | 9/2013 | Paleari .................... | B32B 27/08 428/34.9 |
| 2014/0030539 A1 | 1/2014 | Ui et al. | |

(Continued)

FOREIGN PATENT DOCUMENTS

| | | |
|---|---|---|
| CN | 101065425 A | 10/2007 |
| CN | 102197070 A | 9/2011 |

(Continued)

OTHER PUBLICATIONS

Lotader AX8900 flyer, date N/A.*
Elvaloy PTW flyer, date N/A.*
Safoam RIC-FP flyer, 2017.*
Lotader AX8900 flyer (Year: 2010).*
Elvaloy PTW flyer (Year: 2010).*

(Continued)

*Primary Examiner* — Irina Krylova

(74) *Attorney, Agent, or Firm* — Mary K. Cameron

(57) ABSTRACT

The present invention relates to a thermally expandable composition comprising at least one peroxidically crosslinking polymer which does not contain glycidyl (meth) acrylate as a monomer in copolymerized form; at least one polymer, which is polymerized with glycidyl (meth) acrylate as a monomer present in a proportion of from 2 to 20% by weight, based on the respective polymer; at least one peroxide; and at least one endothermic chemical propellant, moldings containing this composition, and a method for sealing and filling cavities in components, for reinforcing or stiffening components, in particular hollow components, and for bonding movable components using such molded bodies.

24 Claims, No Drawings

(56) References Cited

U.S. PATENT DOCUMENTS

| | | | |
|---|---|---|---|
| 2014/0131910 A1 | 5/2014 | Kohlstrung et al. | |
| 2014/0194545 A1 | 7/2014 | Maesaka et al. | |
| 2015/0246646 A1* | 9/2015 | Kohlstrung | B29C 44/18 |
| | | | 277/312 |
| 2015/0299411 A1 | 10/2015 | Ackermann et al. | |

FOREIGN PATENT DOCUMENTS

| | | | |
|---|---|---|---|
| CN | 102197071 A | 9/2011 |
| CN | 103360690 A | 10/2013 |
| DE | 19632351 A1 | 2/1998 |
| DE | 102011080223 A1 | 2/2013 |
| DE | 102012221192 A1 | 5/2014 |
| EP | 0751173 A1 | 1/1997 |
| EP | 1471105 A2 | 10/2004 |
| EP | 1557453 A2 | 7/2005 |
| FR | 2857615 A1 | 1/2005 |
| GB | 1045316 A | 10/1966 |
| GB | 1079369 A | 8/1967 |
| GB | 1115870 A | 5/1968 |
| GB | 1454580 A | 11/1976 |
| GB | 1465844 A | 3/1977 |
| JP | 6038443 A | 2/1985 |
| JP | 2002012649 A | 1/2002 |
| JP | 2004026938 A | 1/2004 |
| JP | 2006077099 A | 3/2006 |
| JP | 2006176668 A | 7/2006 |
| JP | 2009532571 A | 9/2009 |
| JP | 2011144226 A | 7/2011 |
| JP | 2013501096 A | 1/2013 |
| JP | 2013076047 A | 4/2013 |
| WO | 0130906 A1 | 5/2001 |
| WO | 0183206 A1 | 11/2001 |
| WO | 03002642 A1 | 1/2003 |
| WO | 2005002950 A2 | 1/2005 |
| WO | 2007039309 A1 | 4/2007 |
| WO | 2008021200 A1 | 2/2008 |
| WO | 2008034755 A1 | 3/2008 |
| WO | 2009123793 A1 | 10/2009 |
| WO | 2013017536 A1 | 2/2013 |
| WO | 2013032552 A1 | 3/2013 |
| WO | 20130139646 A1 | 9/2013 |
| WO | 2014018768 A1 | 1/2014 |
| WO | 2015140282 A1 | 9/2015 |

OTHER PUBLICATIONS

International Search Report for PCT/EP2015/073139, dated Dec. 16, 2015. All references cited in the International Search Report are listed herein.
German Search Report for DE 102014221060.7 dated Jun. 12, 2015. All references cited in German Search Report were previously made of record.
International Search Report for PCT/EP2012/064756 dated Oct. 17, 2012.
International Search Report for PCT/EP2013/073537 dated Jul. 7, 2014.
Technical datasheet Varox® DCP-40KE dated Aug. 19, 2009, 1 page. Cited in EP Opposition for EP application 12741319.3. Downloaded on May 31, 2016 from http://www.rtvanderbilt.com/documents/psdocs/71069.pdf.
Technical datasheet of Escorene® UL-7760 dated Mar. 1, 2010, 2 pages. Cited in EP Opposition for EP application 12741319.3. Downloaded on May 31, 2016 from http://exxonmobilchemical.ides.com/datasheet.aspx?l=58933&E=243707&FMT=PDF&CULTURE=en-US.
ASTM D1238, "Standard Test Method for Melt Flow Rates of Thermoplastics by Extrusion Plastometer".

* cited by examiner

THERMALLY EXPANDABLE COMPOSITIONS

The present application relates to a thermally expandable composition containing at least one peroxidically crosslinking polymer which does not contain glycidyl (meth)acrylate as a monomer in copolymerized form, at least one polymer which contains a proportion of 2 to 20 wt %, with respect to the respective polymer, of glycidyl (meth)acrylate as a monomer in copolymerized form, at least one peroxide, and at least one endothermic chemical propellant, molded bodies containing this composition, as well as a method for sealing and filling cavities in components in order to reinforce or stiffen components, in particular, hollow components, and for bonding movable components using such molded bodies.

Modern vehicles and vehicle parts have a multitude of cavities that must be sealed off in order to prevent moisture and contaminants from entering, since they can lead to corrosion on the corresponding body parts from the inside out. This is particularly true of modern, self-bearing body constructions in which a heavy frame construction is replaced by lightweight, structurally rigid frame structures made of prefabricated hollow profiles. Depending on the system, such constructions have a series of cavities that must be sealed off against the penetration of moisture and contaminants. Such seals also serve the purpose of preventing the propagation of airborne noise in such cavities and thus of reducing unpleasant vehicle operation and wind noises and increasing driving comfort in the vehicle.

Acoustic baffles, which have a sealing and/or acoustic effect in such cavities, are often also referred to as "pillar fillers" or "baffles." They generally consist either completely of thermally expandable molded bodies or of molded bodies that contain a carrier and expandable polymeric compositions in their peripheral region. These acoustic baffles are fastened in the bodyshell by hanging, clipping, screwing, or welding on the open structures. After the closing of the structures in the bodyshell and the other pretreatments of the car body, the process heat of the furnaces is then utilized to cure the cathodic dip coating, thus triggering the expansion of the expandable part of the acoustic baffle and thus the cross section of the cavity.

What is more, in modern vehicles metallic lightweight components are required more and more frequently for consistently dimensionally stable series production with a prescribed stiffness and structural strength. Particularly in automotive engineering, a need exists in the context of the desired weight savings for metallic lightweight components made of thin-walled metal sheets that have sufficient stiffness and structural strength nonetheless. Molded bodies made of thermally expandable compositions that impart the required support characteristics are used here as well.

Corresponding thermally expandable compositions are described, for example, in the documents WO 2008/034755, WO 2007/039309, WO 2013/017536, and German application 10 2012 221 192.6. These thermally expandable compositions are also used in the automotive industry.

In such expandable compositions, such as rubber vulcanizates, for example (sulfur, peroxide, or benzoquinone dioxime) for sealing and adhesive bonding, ethylene vinyl acetate-based cavity bulkheading, epoxide-based supporting foams, and expandable sealing compounds in automotive engineering, exothermic propellants such as ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), TSH (toluene-4-sulfonohydrazide), 5-PT (5-phenyl tetrazole), and the like are used.

These propellants have the drawback that they can trigger respiratory sensitization and are generally dubious from a toxicological perspective or are explosive. Moreover, byproducts such as ammoniac, formamide, formaldehyde, or nitrosamines are created when they break down which, according to the Global Automotive Declarable Substance List (GADSL), IFA-KMR List 08/2012, or the BGIA Report "Index of hazardous substances 2012," are banned from automotive engineering. What is more, the VOC (volatile organic compounds) content is very high when exothermic propellants are used.

Furthermore, due to the exothermic dissociation and the narrow temperature range of the dissociation temperature of the above propellants, the foam structure depends on the hardening/foaming temperatures, which are usually in the range from 140-220° C., and can vary quite widely depending on the temperature range. As a result, the expansion rate and the foam structure fluctuate between the minimum and maximum process temperatures. The foam structure, in turn, influences the absorption of water at different hardening temperatures, which can be very high precisely in the case of coarsely porous foams. At temperatures below 140° C., the cited propellants cannot be used effectively.

With respect to water absorption, it is vital especially in the automotive industry that the water absorption be kept as low as possible. Due to the better corrosion resistance and long-term durability, a low water absorption is demanded in the automotive industry. However, the exchanging of exothermic propellants for endothermic propellants can result in an increase in water absorption.

It was therefore the object of the present invention to provide thermally expandable compounds that can manage without the aforementioned exothermic propellants but are suitable for the uses described above in the same manner as the known compounds and, above all, have low water absorption.

Surprisingly, this object is achieved by thermally expandable compositions which contain
  a) at least one peroxidically crosslinking polymer that does not contain glycidyl (meth)acrylate as a monomer in copolymerized form,
  b) at least one polymer that contains glycidyl (meth)acrylate as a monomer in copolymerized form in a proportion from 2 to 20 wt % with respect to the respective polymer,
  c) at least one peroxide, and
  d) at least one endothermic chemical propellant.

Corresponding compositions overcome the known drawbacks while simultaneously meeting the demands placed on such thermally expandable compositions to a high degree, especially with regard to outstanding expansion and low water uptake.

A first object of the present invention is therefore thermally expandable compositions containing
  a) at least one peroxidically crosslinking polymer that does not contain glycidyl (meth)acrylate as a monomer in copolymerized form,
  b) at least one polymer that contains glycidyl (meth)acrylate as a monomer in copolymerized form in a proportion from 2 to 20 wt % with respect to the respective polymer,
  c) at least one peroxide, and
  d) at least one endothermic chemical propellant.

As an essential component, the compositions contain an endothermic chemical propellant, which have the advantage that they are neither harmful to health nor explosive and result in smaller quantities of volatile organic compounds (VOCs). The decomposition products are essentially $CO_2$ and water. Furthermore, the products manufactured therewith have a more uniform foam structure over the entire process temperature range that is used for hardening. In the present case, in combination with the other components of the composition, this also results in an especially low level of water absorption. Finally, the dissociation temperature of the endothermic propellants, particularly of mixtures thereof, is lower in comparison to conventional exothermic propellants, so process temperatures can be reduced and energy saved.

According to the invention, chemical propellants are understood as being compounds that break down under the effect of heat and, in doing so, release gases. In particular, the endothermic chemical propellants selected from among bicarbonates, solid, optionally functionalized polycarboxylic acids and salts thereof and mixtures thereof.

Suitable bicarbonates (hydrogen carbonates) are those of the formula $XHCO_3$, where X can be any cation, particularly an alkali metal ion, preferably $Na^+$ or $K^+$, with $Na^+$ being most preferred. Other suitable cations $X^+$ can be selected from among $NH^{4+}$, $½Zn^{2+}$, $½Mg^{2+}$, $½Ca^{2+}$, and mixtures thereof. Especially preferably, sodium and/or potassium hydrogen carbonate is used, particularly sodium hydrogen carbonate.

Suitable polycarboxylic acids include but are not limited to solid, organic di-, tri- or tetracids, particularly hydroxy-functionalized or unsaturated di-, tri-, tetra- or polycarboxylic acids, such as citric acid, tartaric acid, malic acid, fumaric acid, and maleic acid, for example. The use of citric acid is especially preferred. Citric acid is advantageous because, among other things, it represents an ecologically sustainable propellant.

The salts of the abovementioned acids, as well as mixtures of two or more of the described compounds, are also suitable. In the case of salts of polycarboxylic acids, the counterion is preferably selected from among $Na^+$, $K^+$, $NH^{4+}$, $½Zn^{2+}$, $½Mg^{2+}$, $½Ca^{2+}$, and mixtures thereof, with $Na^+$ and $K^+$, particularly $Na^+$, being preferred. Particularly the salts of the polycarboxylic acids exhibit dissociation temperatures that are shifted toward higher temperatures, so that a broader temperature interval of the dissociation can be set by mixing.

When polycarboxylic acids are used, carbonates can also preferably be used in addition. A mixture of hydrogen carbonates and carbonates as well as polycarboxylic acids is preferred, by means of which various activation levels and decomposition reactions can be set in a targeted manner.

Especially preferred propellants are sodium hydrogen carbonate and/or citric acid/citrates; very especially preferably, the propellant is a mixture of sodium hydrogen carbonate and citric acid. In comparison to conventional exothermic propellants such as ADCA or OBSH, such a mixture has a very low starting temperature of only 120-140° C., whereas OBSH has a starting temperature of 140-160° C. and ADCA activated with zinc salts has a starting temperature of 160-170° C. and, when unactivated, of even 210-220° C.

The propellants can also contain additional additives such as, in particular, calcium oxide, zeolites, zinc oxide, and/or magnesium oxide. Calcium oxide, zinc oxide, and/or magnesium oxide can be used for activation.

In various embodiments, the thermally expandable compositions contain the propellant in a quantity from 0.1 to 40 wt %, preferably 1 to 35 wt %, more preferably 5 to 35 wt %, especially preferably 10 to 30 wt %, and very especially preferably 15 to 25 wt % with respect to the overall composition. The percents by weight (wt %) refer to the overall composition before expansion, unless indicated otherwise.

In a preferred embodiment, the compositions contain 1 to 10 wt %, preferably 2 to 8 wt % sodium hydrogen carbonate and 5 to 35 wt %, preferably 10 to 25 wt %, most preferably 15 to 22 wt % citric acid. The percents by weight (wt %) refer to the overall composition before expansion, unless indicated otherwise. A ratio of sodium hydrogen carbonate to citric acid of 1:1 to 1:20, preferably 1:2 to 1:10, is preferred.

In an especially preferred embodiment, the propellant is introduced into the thermally expandable composition as a "master batch." A master batch is understood as a premixture of the propellant to be used, for example with a polymer, preferably the polymers a) and b) being used. Besides the process-related advantages, this approach has the advantage that the propellant can be distributed in an especially homogeneous and gentle manner, thereby producing less heat through kneading/mixing. The propellant can thus be protected from unwanted disintegration. A master batch that contains the at least one endothermic propellant, preferably sodium hydrogen carbonate and citric acid, and at least one polymer, preferably a portion of the peroxidically crosslinkable polymer a), is especially preferred. Besides that, the master batch can also contain other components such as talcum and/or antioxidants.

The thermally expandable preparations are preferably substantially free of ADCA (azodicarbonamide) and/or OBSH (4,4'-oxybis(benzenesulfonyl hydrazide)), particularly of exothermic propellants. According to the invention, the expression "substantially free of" is understood as referring to compositions containing less than 3 wt %, preferably less than 1 wt %, very especially preferably less than 0.1 wt % of the respective substance, and in particular does not contain the respective substance.

Besides the endothermic propellant, the thermally expandable composition contains, as a binder system, at least one peroxidically crosslinkable polymer a), which does not contain glycidyl (meth)acrylate as a monomer in copolymerized form. The parentheses around meth expresses the fact that both glycidyl methacrylates and glycidyl acrylate are meant.

In principle, all thermoplastic polymers and thermoplastic elastomers are worthy of consideration that can be crosslinked peroxidically. A person skilled in the art refers to polymers as being "peroxidically crosslinkable" in which a hydrogen atom can be abstracted from the main or a side chain through the action of a radical starter, so that a radical is left behind that attacks other polymer chains in a second reaction step.

In a preferred embodiment, the at least one peroxidically crosslinkable polymer a) is selected from among styrene butadiene block copolymers, styrene isoprene block copolymers, ethylene vinyl acetate copolymers, functionalized ethylene vinyl acetate copolymers, functionalized ethylene butyl acrylate copolymers, ethylene methyl acrylate copolymers, ethylene ethyl acrylate copolymers, ethylene butyl acrylate copolymers, ethylene (meth)acrylic acid copolymers, ethylene-2-ethylhexyl acrylate copolymers, ethylene ethyl ester copolymers, and polyolefins, such as polyethylene or polypropylene, for example.

According to the invention, a functionalized copolymer is understood as being a copolymer that is provided with additional hydroxide groups, amino groups, carboxy groups, anhydride groups, and/or acrylate groups.

The following are especially advantageous in terms of the present invention: ethylene vinyl acetate copolymers, functionalized ethylene vinyl acetate copolymers, functionalized ethylene butyl acrylate copolymers, ethylene propylene diene copolymers, styrene butadiene block copolymers, styrene isoprene block copolymers, ethylene methyl acrylate copolymers, ethylene ethyl acrylate copolymers, ethylene butyl acrylate copolymers, and ethylene (meth)acrylic acid copolymers. Ethylene vinyl acetate copolymers and functionalized ethylene vinyl acetate copolymers, particularly ethylene vinyl acetate copolymers containing no additional monomer units in copolymerized form (pure ethylene vinyl acetate copolymers) are very especially preferred.

Thermally expandable preparations that contain at least one ethylene vinyl acetate copolymer with a vinyl acetate content of 5 to 30 wt %, particularly 10 to 25 wt %, and most preferably 15 to 20 wt % with respect to the total mass of the copolymers, are especially preferred according to the invention.

Moreover, it has proven advantageous if the thermally expandable preparation contains a peroxidically crosslinkable polymer a), particularly an ethylene vinyl acetate copolymer, with a melt mass-flow rate of 0.3 to 400 g/10 min, particularly 0.5 to 45 g/10 min. Peroxidically crosslinkable polymers a), particularly ethylene vinyl acetate copolymers, with a melt mass-flow rate of 1.5 to 25 g/10 min, particularly 2 to 10 g/10 min, and very especially 2 to 8 g/10 min, are especially advantageous. It may be advantageous according to the invention if two or more polymers with different melt mass-flow rates are used in the thermally expandable preparations.

The melt mass-flow rate is determined for this purpose in a capillary rheometer, with the polymer being fused at 190° C. in a heatable cylinder and pressed through a defined nozzle (capillary) by the pressure resulting from the load pressure (2.16 kg) (ASTM D1238). The emerging mass is determined as a function of time.

In a preferred embodiment, such as for low-temperature expanding formulations, the polymers a) have a melting point (which can be determined using DSC according to ASTM D3417) below the dissociation temperature of the endothermic propellant. Preferably, the polymer a) has a melting point below 100° C., preferably between 90 and 60° C.

The thermally expandable preparations preferably contain at least 30 wt % and more preferably no more than 80 wt %, particularly no more than 70 wt % of at least one peroxidically crosslinkable polymer a) that does not contain glycidyl (meth)acrylate as a monomer in copolymerized form, particularly of at least one ethylene vinyl acetate copolymer. Thermally expandable preparations that contain 30 to 80 wt %, particularly 40 to 70 wt %, preferably 45 to 65 wt % of at least one peroxidically crosslinkable polymer a), each with respect to the total mass of the thermally expandable preparation, are especially preferred.

As an additional component besides the peroxidically crosslinkable polymer a) that do not contain glycidyl (meth)acrylate as a monomer in copolymerized form, the thermally expandable compositions contain at least one polymer b), which contains glycidyl (meth)acrylate as a monomer in copolymerized form in a proportion of 2 to 20 wt % with respect to the respective polymer. The glycidyl (meth)acrylate on the polymer b) is 2 to 20 wt %, particularly 3 to 15 wt %, more preferably 6 to 10 wt % with respect to the total mass of the copolymers. The polymers b) preferably contain glycidyl methacrylate.

The peroxidically crosslinkable polymers described above are suitable as polymers b), in which case the polymers b) contain glycidyl (meth)acrylate as a unit. Terpolymers are especially preferred which, besides glycidyl (meth)acrylate as a unit, preferably contain monomers selected from the group of ethylene, propylene, acrylic acid esters, such as, preferably, methyl (meth)acrylate, ethyl (meth) acrylate, propyl (meth)acrylate, or butyl (meth)acrylate, styrene, and vinyl acetate. Ethylene/(meth)acrylic acid ester/ glycidyl (meth)acrylate terpolymers, particularly ethylene/ methyl (meth)acrylate/glycidyl methacrylate and ethylene/ butyl (meth)acrylate/glycidyl methacrylate are very especially preferred.

Moreover, it has proven advantageous if the melt mass-flow rate of the polymer b), particularly of the terpolymer, is 0.3 to 400 g/10 min, particularly 0.5 to 45 g/10 min. Polymers b), particularly terpolymers, having a melt mass-flow rate of 1.5 to 25 g/10 min, particularly 2 to 15 g/10 min, are especially advantageous.

In a preferred embodiment, such as for low-temperature expanding formulations, the polymers b) have a melting point (which can be determined using DSC according to ASTM D3417) below the dissociation temperature of the endothermic propellant. Preferably, the polymer b) has a melting point below 100° C., preferably between 90 and 60° C., more preferably between 80 and 65° C.

It may be advantageous according to the invention if two or more, particularly two different polymers b) are used in the thermally expandable preparations. Especially for the purpose of improving low water absorption, two different terpolymers b) are advantageous. Preferably, an ethylene/ methyl (meth)acrylate/glycidyl methacrylate and an ethylene/butyl(meth)acrylate/glycidyl methacrylate are contained.

The thermally expandable preparations preferably contain at least 2 wt % and more preferably no more than 40 wt %, particularly no more than 20 wt % of at least one polymer b), which contains glycidyl methacrylate as a monomer in copolymerized form in a proportion from 2 to 20 wt % with respect to the respective polymer, particularly of at least one terpolymer. Thermally expandable preparations that contain 2 to 40 wt %, particularly 5 to 25 wt %, preferably 7.5 to 20 wt % of at least one peroxidically crosslinkable polymer b), each with respect to the total mass of the thermally expandable preparation, are especially preferred.

As an additional component besides the peroxidically crosslinkable polymers, the thermally expandable preparations can preferably contain at least one low-molecular multifunctional acrylate.

A "low-molecular multifunctional acrylate" is understood as being a compound that has at least two acrylate groups and a molar weight below 2400 g/mol, preferably below 800 g/mol. Particularly those compounds which have two, three, or more acrylate groups per molecule have proven to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butanediol dimethacrylate, 1,3-butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate, and polybutylene glycol dimethacrylate.

Preferred low-molecular acrylates with three or more acrylate groups are glycerin triacrylate, di-pentaerythritol hexaacrylate, pentaerythritol triacrylate (TMM), tetramethylol methane tetraacrylate (TMMT), trimethylol propane triacrylate (TMPTA), pentaerythritol trimethacrylate, di-(trimethylol propane)-tetraacrylate (TMPA), pentaerythritol tetraacrylate, trimethylol propane trimethacrylate (TMPTMA), tri(2-acryloxyethyl)isocyanurate, and tri(2-methacryloxyethyl)trimellitate as well as ethoxylated and propoxylated derivatives thereof with a content of no more than 35 EO units and/or no more than 20 PO units.

Thermally expandable preparations that contain a low-molecular multifunctional acrylate selected from among triethylene glycol diacrylate, triethylene glycol dimethacrylate, trimethylol propane triacrylate (TMPTA) and trimethylol propane trimethacrylate (TMPTMA), pentaerythritol triacrylate (TMM), tetramethylol methane tetraacrylate (TMMT), pentaerythritol trimethacrylate, di-(trimethylol propane) tetraacrylate (TMPA), and pentaerythritol tetraacrylate are very especially preferred according to the invention.

Besides the low-molecular acrylates, the thermally expandable preparations can contain additional co-crosslinkers, such as, for example, allyl compounds, such as allyl cyanurate, triallyl isocyanurate, triallyl trimesate, triallyl trimellitate (TATM), tetraallyl pyromellitate, the diallyl esters of 1,1,3-trimethyl-5-carboxy-3-(4-carboxyphenyl)indene, trimethylolpropane trimellitate (TMPTM), or phenylene dimaleimides.

It has proven especially expedient if the thermally expandable preparations contain at least one low-molecular multifunctional acrylate selected from among triethylene glycol diacrylate, trimethylol propane triacrylate (TMPTA), and trimethylol propane trimethacrylate (TMPTA).

The co-crosslinkers, preferably the low-molecular multifunctional acrylates, are preferably contained in the thermally expandable preparations in a quantity of 0.2 to 2.5 wt %, particularly 0.4 to 1.4 wt %, each with respect to the total mass of the thermally expandable preparation.

As a hardener system for the peroxidically crosslinkable polymers, the thermally expandable preparations contain at least one peroxide. The organic peroxides, such as ketone peroxides, diacyl peroxides, peresters, perketals, and hydroperoxides, for example, are particularly suitable. Especially preferred compounds include, for example, cumene hydroperoxide, t-butyl peroxide, bis(tert-butylperoxy)-diisopropyl benzene, di(tert-butylperoxyisopropyl)benzene, dicumyl peroxide, t-butylperoxybenzoate, di-alkyl peroxydicarbonate, diperoxyketales (e.g., 1,1-di-tert-butylperoxy-3,3,5-trimethylcyclohexane), ketone peroxide (e.g., methylethyl ketone peroxide), 4,4-di-tert-butylperoxy-n-butyl-valerates and trioxepanes (e.g., 3,3,5,7,7-pentamethyl-1,2,4-trioxepane).

The peroxides sold commercially by Akzo Nobel and Pergan, for example, are especially preferred, such as 3,3,5,7,7-pentamethyl-1,2,4-trioxepane, 2,5-dimethyl-2,5-di(tert.-butylperoxy)hexane, di-tert.-butyl peroxide, 2,5-dimethyl-2,5-di(tert.-butylperoxy)hexane, tert.-butylcumyl peroxide, di-(2-tert.-butylperoxyisopropyl)benzene, dicumyl peroxide, butyl-4,4-di(tert.-butylperoxy)valerate, tert-butylperoxy-2-ethylhexyl carbonate, 1,1-di-(tert.-butylperoxy)-3,3,5-trimethyl cyclohexane, tert.-butylperoxybenzoate, di-(4-methylbenzoyl)peroxide, and dibenzoyl peroxide.

It has also proven advantageous if the peroxides used are substantially inert at room temperature and are only activated when heated to higher temperatures (for example, when heated to temperatures between 130° C. and 240° C.). It is especially advantageous if the peroxide used has a half-life of greater than 60 minutes at 65° C.; that is, after the thermally expandable preparation containing the peroxide is heated to 65° C. for 60 minutes, less than half of the peroxide used has dissociated. According to the invention, peroxides that have a half-life of 60 minutes at 115° C., particularly 130° C., may be especially preferred.

Especially preferably, at least one peroxide selected from among di(tert.-butylperoxy isopropyl)benzene, dicumyl peroxide, 1,1-di-(tert.-butylperoxy)-3,3,5-trimethyl cyclohexane, 2,5-dimethyl-2,5-di(tert.-butylperoxy)hexane, dibenzoyl peroxide, and di-tert.-butyl-1,1,4,4-tetramethyl but-2-in-1,4-ylene diperoxide is contained.

Furthermore, it is advantageous according to the invention if at least one peroxide is used in a form that is applied to a solid, inert carrier, such as calcium carbonate and/or silica and/or kaolin, for example.

Preferably, the peroxide is selected such that the crosslinking temperature T90 is below, preferably 15-35° C. below, the dissociation temperature of one of the endothermic propellants contained. This promotes a high gas yield and thus a high level of expansion of the material. Some exemplary embodiments would be a peroxide (T90=105° C.) with a sodium bicarbonate starting dissociation temperature 130° C. or a peroxide (T90=170° C.) with a citric acid starting dissociation temperature of 195° C. The crosslinking temperature T90 is defined as the temperature at which a 90% crosslinking of the material is achieved within 12 minutes.

The dissociation temperature of the endothermic propellant indicates the temperature at which the endothermic propellant begins to dissociate, which can also be referred to as the activation temperature. The crosslinking temperature T90 is defined as the temperature at which a 90% crosslinking of the material is achieved within 12 minutes. The crosslinking temperature T90 and the degree of crosslinking can be determined by means of a rheometer measurement, such as with a Monsanto 100 S rheometer (principle of an oscillating disc with a deflection angle of 3°, about 15 cm³ chamber volume) according to DIN 53529.

The at least one peroxide is preferably contained in the thermally expandable preparations according to the invention in a quantity of 0.1 to 4 wt %, preferably in a quantity of 0.2 to 2 wt %, and particularly in a quantity of 0.5 to 1.3 wt %, each determined as the active substance content of peroxide with respect to the total mass of the thermally expandable preparation.

Besides the abovementioned components, the thermally expandable masses can also contain additional common components such as fillers, softening agents, reactive diluents, rheology additives, wetting agents, adhesion promoters, antioxidants, stabilizers, and/or color pigments.

Examples of suitable softening agents are alkyl esters of dibasic acids (e.g., phthalate esters, adipic acid polyesters), technical white and process oils (paraffins), diaryl ethers, benzoates of polyalkylene glycols, citric acid esters (e.g., citric acid triethyl esters), organic phosphates, and alkylsulfonic acid esters of phenol or cresol.

Some examples of fillers that merit consideration are the various ground or precipitated chalks, calcium-magnesium carbonates, talcum, graphite, barite, silicic acids, or silica, as well as, in particular, siliceous fillers such as mica, for instance in the form of chlorite, or siliceous fillers of the type of aluminum magnesium calcium silicate, e.g., wollastonite. Talcum is an especially preferred filler. Preferably, the fillers are coated, preferably with stearic acid or stearates. This has a positive influence on pourability.

The fillers are preferably contained in a quantity of 0 to 60 wt %, particularly 0 to 50 wt %, preferably 0.1 to 40 wt %, and especially preferably 1 to 30 wt %, each with respect to the mass of the overall thermally expandable composition.

Chromophoric components, particularly black graphite- and/or soot-based dyes, are preferably contained in the thermally expandable compositions according to the invention in a quantity of 0 to 2 wt %, particularly 0.1 to 0.8 wt %, and very especially preferably 0.15 to 0.5 wt %, each with respect to the mass of the overall thermally expandable composition.

Sterically hindered phenols or mixtures thereof and/or sterically hindered thiol ethers and/or sterically hindered aromatic amines, diphosphonites, disulfides can be used as antioxidants or stabilizers, such as bis-(3,3-bis-(4'-hydroxy-3-tert. butyl phenyl) butanoic acid)-glycol ester or also 4-methylphenol, reaction product with dicyclopentadiene and isobutylene (Wingstay L).

Antioxidants or stabilizers are preferably contained in the thermally expandable compositions according to the invention in a quantity of 0 to 4 wt %, particularly 0.1 to 1.5 wt %, and more preferably 0.1 to 0.5 wt %, each with respect to the mass of the overall thermally expandable composition.

Desiccants such as calcium oxide and/or zeolites are preferably contained in the thermally expandable compositions according to the invention in a quantity of 0 to 5 wt %, particularly 0.1 to 2.5 wt %, each with respect to the mass of the overall thermally expandable composition.

The thermally expandable compositions according to the invention are preferably formulated such that they are solid at 22° C. According to the invention, a thermally expandable composition is regarded as being "solid" if the geometry of this composition does not deform under the influence of gravity at the indicated temperature within 1 hour, particularly within 24 hours.

The thermally expandable compositions according to the invention can be prepared by mixing the selected components in any suitable mixer, such as a kneader, a double-Z kneader, an internal mixer, a twin-screw mixer, a continuous mixer or an extruder, particularly a twin-screw extruder.

Although it may be advantageous to heat the components some in order to facilitate the production of a homogeneous, uniform mass, care must be taken that temperatures are not reached which bring about the activation of the hardeners, the accelerators, and/or the propellant. The resulting thermally expandable composition can be shaped immediately after it is manufactured, for example through blow-molding, pelletizing, injection-molding processes, compression-molding processes, punching methods, or extrusion.

The expansion of the thermally expandable composition occurs as a result of heating, with the composition being heated for a defined period of time to a specific temperature that is sufficient to activate the propellant. Depending on the composition of the composition and the conditions of the production line, such temperatures usually lie in the range from 110° C. to 240° C., preferably from 120° C. to 210° C., with a dwell time of 10 to 90 minutes, preferably 5 to 60 minutes.

In the area of automotive engineering, it is especially advantageous if the expansion of the compositions according to the invention occur while the vehicle is passing through the furnaces to harden the cathodic dip coating, thus eliminating the need for a separate heating step.

The thermally expandable compositions of the present invention can be used in a wide range of supporting, filling, sealing and adhesive applications, for example in the area of the acoustic baffles in order to seal off cavities in vehicles. However, the use thereof as adhesive for linings, for example in the door or roof area, is also conceivable. For such an application, the thermally expandable compositions according to the invention can be applied by means of direct extrusion. However, the compositions can also be applied to the place of application in extruded form and pressed and surface-fused there by heating the steel. A third alternative is also application as a co-extrudate. In this embodiment, a second tacky composition is applied according to the invention in a thin layer beneath the actual non-tacky molded part made of the thermally expandable composition according to the invention. In the context of this embodiment, this second tacky layer serves the purpose of fixing the molded part in the bodyshell.

Accordingly, the thermally expandable compositions are especially suitable for the manufacture of molded bodies, particularly acoustic baffles for sealing off cavities, i.e., for the manufacture of parts that are inserted into the cavities of vehicles, subsequently expand and simultaneously harden through heating, and thereby seal off the cavity as completely as possible.

A second object of the present invention is therefore a molded body that has a thermally expandable composition according to the invention. This can be an acoustic baffle for sealing off cavities of a component, for example, whose shape is adapted to the cavity.

According to the invention, a "shape that is adapted to the cavity" refers to any and all geometries of acoustic baffles that ensure the complete sealing of the cavity after expansion. The shape of the acoustic baffle can be based individually on the shape of the cavity and have corresponding tips and/or roundings; in the case of the thermally expandable compositions according to the invention with high degrees of expansion, however, the introduction of a commensurately small quantity into the cavity in variable form, for example in the form of a bead or elongated strand of the material, can be sufficient in order to ensure the complete sealing of the cavity after expansion.

Such acoustic baffles are usually manufactured from the thermally expandable compositions according to the invention using injection molding techniques. The thermally expandable compositions are heated to temperatures in the range from 70 to 120° C. and then injected into an appropriately designed mold.

The molded bodies according to the invention can be used in all products that have hollow spaces. Besides vehicles, these also include aircraft, railway vehicles, household appliances, furniture, buildings, walls, partitions, or even boats, for example.

Another object of the object of the present invention is a method for sealing and filling cavities in components, for reinforcing or stiffening components, particularly hollow components, and for adhering movable components using the compositions and molded bodies. Preferably, the method is a method for sealing cavities of a component in which an acoustic baffle according to the invention is introduced into the cavity and then heated to a temperature above 110° C., so that the thermally expandable composition expands and seals off the cavity.

Another object of the present invention is the use of a molded body or acoustic baffle according to the invention for acoustically sealing cavities in components and for sealing cavities in components against water and/or moisture.

Yet another object of the present invention is the use of a molded body according to the invention for reinforcing or stiffening components, particularly hollow components.

The following examples are intended to explain the invention in further detail, although the selection of the examples is not intended to constitute any restriction of the scope of the object of the invention. In the compositions, all indicated quantities are parts by weight unless indicated otherwise.

EXEMPLARY EMBODIMENTS

General Test Procedure/Production of the Formulations:

To prepare the thermally expandable preparations according to the invention, the contained polymers were processed into a homogeneous mass at room temperature in the kneader or, if necessary, under heating to up to 150° C. with fillers. The other, non-reactive components such as fillers, soot, stabilizers, and softening agents, if present, were then added one after the other and kneading was continued until the formulation was smooth.

At below 70° C., all of the reactive components such as, for example, accelerators, peroxides, activators and catalysts, zinc oxide, calcium oxide, and propellant were then added and kneaded together slowly until the adhesive was homogeneously mixed. The propellants were then used as a master batch in part.

Determination of the Expansion

To determine the expansion, test specimens having the approximate dimensions 20 mm×20 mm×3 mm were cut out of the manufactured sheets of the exemplary formulations, these were placed into a convection oven, which was heated to the temperatures named in the tables (heating-up time about 7 to 10 minutes), and the test specimens were then left at this temperature for the time period indicated in the tables (including the heating-up time). The expansion at 175° C. corresponds to the ideal conditions that are achieved during curing in automotive engineering. The expansion at 160° C. simulates underbaking conditions, and the expansion at 200° C. simulates overbaking conditions.

The extent of the expansion [%] was determined using the water displacement method according to the formula $$\text{Expansion} = \frac{(m2 - m1)}{m1} \times 100$$

m1=mass of the test specimen in the original state in deionized water
m2=mass of the test specimen after annealing in deionized water.

Determination of Water Absorption

To determine the water absorption, test specimens having approximate dimensions 20 mm×20 mm×3 mm were prepared in a manner analogous to those for determining the expansion and expanded and hardened in the convection oven at predefined temperatures analogously to the method for determining expansion, as indicated in the tables. The test specimens expanded in this way were then conditioned for 24 hours in a standard atmosphere (23° C., 50% relative humidity); the mass m was determined immediately after conditioning.

For storage in the water bath, the test specimens were kept in a container filled with water about 5-10 cm below the water surface for 24 hours at 23° C. After removal, the test specimens were drained, superficially dried using an absorbent cloth, and weighed again mo. The test specimens were then stored again for 24 hours in a standard atmosphere (23° C., 50% relative humidity) and weighed again $m^{24}$.

The water absorption [wt %] was calculated according to the following equation:

$$\text{Water absorption} = \frac{m_i - m}{m} \times 100$$

m: Mass of the test specimen before storage in water in the immersion bath
$m_i$: Mass of the test specimen after storage in water in the immersion bath after time i
i=0: Measurement immediately after removal
i=24: Measurement after 24 hours in the standard atmosphere (23° C., 50% relative humidity)

Exemplary Formulation (EVA-Based, Peroxide-Crosslinking)

| Substance name/group (generic names) | Comparative formulation 1 | Comparative formulation 2 | Inventive formulation 1 | Inventive formulation 2 | Inventive formulation 3 |
|---|---|---|---|---|---|
| EVA polymer 1 | 63.45 | 67.2 | 43.7 | 53.7 | 51.70 |
| Terpolymer | | | 15.00 | 10.00 | 10.00 |
| Terpolymer 2 | | | | | 2.00 |
| Citric acid | 17.50 | 15.00 | 20.00 | 17.50 | 17.50 |
| NaHCO$_3$ | 3.50 | 3.00 | 4.00 | 3.50 | 3.50 |
| Talcum | 5.25 | 4.50 | 6.00 | 5.25 | 5.25 |
| EVA polymer 2 | 8.75 | 7.50 | 10.00 | 8.75 | 8.75 |
| Peroxide 1 | | | | | |
| Peroxide 2 | 1.25 | 2.5 | 1.00 | 1.00 | 1.00 |
| Antioxidant | 0.3 | 0.3 | 0.3 | 0.3 | 0.30 |
| Process oil | | | | | |
| Co-crosslinker | | | | | |
| TOTAL | 100 | 100 | 100 | 100 | 100 |
| Expansion | | | | | |
| 20 min, 160° C. | 278 | 416 | 554 | 666 | 511 |
| 25 min, 175° C. | 510 | 487 | 659 | 676 | 656 |
| 40 min, 200° C. | 380 | 325 | 928 | 938 | 962 |

| Substance name/group (generic names) | Comparative formulation 1 | Comparative formulation 2 | Inventive formulation 1 | Inventive formulation 2 | Inventive formulation 3 |
|---|---|---|---|---|---|
| Water absorption immediately after removal in % | | | | | |
| 20 min, 160° C. | 9.8 | 11.6 | 4.9 | 4.9 | 6.0 |
| 25 min, 175° C. | 7.6 | 9.2 | 5.0 | 5.0 | 4.5 |
| Water absorption after 24 hours in % | | | | | |
| 20 min, 160° C. | 0.8 | 0.7 | 0.3 | 0.1 | 0.0 |
| 25 min, 175° C. | 1.1 | 1.2 | 0.2 | 0.0 | 0.0 |

Exemplary Formulation (EVA-Based, Peroxide-Crosslinking)

| Substance name/group (generic names) | Inventive formulation 4 | Inventive formulation 5 | Inventive formulation 6 | Inventive formulation 7 | Inventive formulation 8 |
|---|---|---|---|---|---|
| EVA polymer 1 | 51.20 | 48.70 | 46.20 | 49.70 | 51.90 |
| Terpolymer | 10.00 | 10.00 | 10.00 | 9.50 | 10.00 |
| Terpolymer 2 | 2.00 | 2.50 | 5.00 | 7.50 | 2.00 |
| Citric acid | 17.50 | 17.50 | 17.50 | 17.50 | 17.50 |
| NaHCO$_3$ | 3.50 | 3.50 | 3.50 | 3.50 | 3.50 |
| Talcum | 5.25 | 5.25 | 5.25 | 5.25 | 5.25 |
| EVA polymer 2 | 8.75 | 8.75 | 8.75 | 8.75 | 8.75 |
| Peroxide | | | | | 0.20 |
| Peroxide | 1.00 | 1.00 | 1.00 | 1.00 | 0.60 |
| Antioxidant | 0.30 | 0.30 | 0.30 | 0.30 | 0.30 |
| Process oil | | | | 1.00 | |
| Co-crosslinker | | | | 1.50 | |
| TOTAL | 100 | 100 | 100 | 100 | 100 |
| Expansion | | | | | |
| 20 min, 160° C. | 529 | 488 | 497 | 474 | 527 |
| 25 min, 175° C. | 668 | 646 | 634 | 632 | 667 |
| 40 min, 200° C. | 981 | 989 | 945 | 932 | 990 |
| Water absorption immediately after removal in % | | | | | |
| 20 min, 160° C. | 3.6 | 4.7 | 4.1 | 4.1 | 4.8 |
| 25 min, 175° C. | 3.9 | 2.7 | 5.1 | 4.1 | 4.0 |
| Water absorption after 24 hours in % | | | | | |
| 20 min, 160° C. | 0.0 | 0.0 | 0.3 | 0.1 | 0.0 |
| 25 min, 175° C. | 0.0 | 0.0 | 0.0 | 0.4 | 0.0 |

Components Used:

| | | |
|---|---|---|
| EVA polymer 1 | | EVA, 16.5-19.5% VA content, melting point 82-90° C., MFI 1.5-6 g/10 min (190° C., 2.16 kg)) |
| Terpolymer | | Terpolymer (GMA/EBA), reactive ethylene terpolymer, 9 wt % Glycidyl methacrylate, 20 wt % Butyl acrylate, melting point 72° C., MFI 8 g/10 min (190° C., 2.16 kg)) |
| Terpolymer 2 | | Ethylene acrylic acid ester glycidyl methacrylate terpolymer, methyl acrylate content 24 wt %, glycidyl methacrylate content 8 wt %, melting point 65° C., MFI 6 g/10 min (190° C., 2.16 kg) |
| Master batch | Citric acid | Citric acid, dissociation temperature >150° C. (TGA measurement) |
| | NaHCO$_3$ | NaHCO$_3$, dissociation temperature >120° C. (TGA measurement) |
| | Talcum | Talcum |
| | EVA polymer 2 | EVA, 17-19% VA, melting point 85-89° C., MFI about 1.5-4 g/10 min (190° C., 2.16 kg)) |
| Peroxide 1 | | Di-(2-tert.-butyl-peroxyisopropyl)-benzene, 95% peroxide, 8.98% active oxygen content, half-life temperature 1 h = 146° C., t90 = 175° C. (rheometer t90 about 12 min) |

| | |
|---|---|
| Peroxide 2 | 2,5-dimethyl-2,5-di-(tert.-butylperoxy)-hexane, 45% peroxide, powder with chalk, 4.96% active oxygen content, half-life temperature 1 h = 147° C., t90 = 175° C. (rheometer t90 about 12 min) |
| Antioxidant | Bis[3,3-bis-(4'-hydroxy-3'-tert-butylphenyl)butanoic acid]-glycol ester, molecular weight 794 g/mol, melting point 167-171° C. |
| Process oil | Paraffin process oil, pour point 18° C., kinematic viscosity, 3000 mm$^2$/s at 40° C. |
| Co-crosslinker | Trimethylol propane trimethacrylate, TMPTMA, |

The tests according to the invention show low water absorption, particularly the examples with two terpolymers. At the same time, the results with respect to the expansion behavior were able to be improved.

What is claimed is:

1. A thermally expandable composition, wherein the thermally expandable composition is solid at 22° C. and comprises:
   a) 45 to 65 wt. % of at least one peroxidically crosslinking polymer that does not contain glycidyl (meth)acrylate as a monomer in copolymerized form, wherein the at least one peroxidically crosslinking polymer is selected from the group consisting of ethylene vinyl acetate copolymers with a vinyl acetate content of 10 to 25 wt. %, with respect to a total mass of the ethylene vinyl acetate copolymer, and a melt mass-flow rate in a range of 1.5 to 25 g/10 min (190° C., 2.16 kg),
   b) 12 to 20 wt. % of a combination of two different terpolymers, selected such that each terpolymer has a melt mass-flow rate in a range of 6 to 15 g/10 min (190° C., 2.16 kg) and comprises glycidyl methacrylate as a monomer in copolymerized form in a proportion of from 3 to 15 wt. %, wherein one of the terpolymers contains the glycidyl methacrylate, ethylene and butyl acrylate as monomers in copolymerized form and the other of the terpolymers contains the glycidyl methacrylate, ethylene and methyl acrylate as monomers in copolymerized form, wherein the terpolymer which contains the glycidyl methacrylate, ethylene and methyl acrylate as the monomers is present in an amount of 2 to 7.5 wt. %,
   c) 0.5 to 1.3 wt. % of at least one peroxide selected from the group consisting of di(tert-butylperoxy isopropyl) benzene, dicumyl peroxide, 1,1-di-(tert-butylperoxy)-3,3,5-trimethyl cyclohexane, 2,5-dimethyl-2,5-di(tert-butylperoxy)hexane, dibenzoyl peroxide, and di-tert-butyl-1,1,4,4-tetramethyl but-2-yn-1,4-ylene diperoxide, and
   d) 21 to 30 wt. % of an endothermic chemical propellant which comprises a mixture of sodium hydrogen carbonate and citric acid, selected such that said mixture exhibits an activation temperature of 120-140° C.;
   wherein the thermally expandable composition does not contain exothermic propellants; and the at least one peroxidically crosslinking polymer of the component a) and the two different terpolymers of the component b) are selected such that they each have melting points less than the activation temperature of the endothermic propellant;
   wherein the thermally expandable composition expands at least 632% to 676% when heated for 25 minutes at 175° C. to obtain a foam structure that exhibits a water absorption of not more than 0.4 wt. % after 24 hours storage in water at 23° C. and subsequent storage at 23° C., 50% relative humidity for 24 hours.

2. A molded body, wherein the molded body has the thermally expandable composition of claim 1.

3. A method for sealing cavities in components against water, moisture or acoustically comprising steps of:
   a) inserting the molded body of claim 2 into a cavity of a component; and
   b) heating the molded body to a temperature above 110° C., such that the thermally expandable composition of the molded body expands and hardens thereby sealing the cavity.

4. A method for reinforcing components, comprising steps of:
   a) inserting the molded body of claim 2 into a cavity of a component or fixing said molded body to a component; and
   b) heating the molded body to a temperature above 110° C., such that the thermally expandable composition of the molded body expands and hardens thereby reinforcing the component.

5. A method for adhering movable components which comprises steps of: providing the thermally expandable composition of claim 1 between the movable components; and then heating to a temperature above 110° C., such that the thermally expandable composition expands into contact with both movable components and adheres the movable components to each other.

6. A method reinforcing components comprising steps of: providing a component with the thermally expandable composition of claim 1; and then heating to a temperature above 110° C., such that the thermally expandable composition expands and reinforces the component.

7. The thermally expandable composition of claim 1, wherein the at least one peroxide comprises both 2,5-dimethyl-2,5-di(tert.-butylperoxy)hexane and di(tert.-butylperoxy isopropyl)benzene.

8. The thermally expandable composition of claim 1, additionally comprising at least one co-crosslinker selected from the group consisting of low-molecular weight multifunctional acrylates.

9. The thermally expandable composition of claim 1, additionally comprising 1 to 30 wt. % of at least one filler.

10. The thermally expandable composition of claim 9, wherein the at least one filler comprises talcum.

11. The thermally expandable composition of claim 1, additionally comprising 0.2 to 2.5 wt. % of at least one co-crosslinker selected from the group consisting of low-molecular weight multifunctional acrylates.

12. The thermally expandable composition of claim 11, wherein the low-molecular multifunctional acrylates are compounds which have two, three, or four acrylate groups per molecule.

13. A method for sealing cavities in components comprising steps of: providing the thermally expandable composition of claim 1 to the cavity of the component; and then heating to a temperature above 110° C., such that the thermally expandable composition expands and seals the cavity of the component.

14. A thermally expandable composition, wherein the thermally expandable composition is solid at 22° C. and comprises:
   a) 45 to 65 wt. % of at least one peroxidically crosslinking polymer that does not contain glycidyl (meth)acrylate as a monomer in copolymerized form, wherein the at least one peroxidically crosslinking polymer is selected from the group consisting of ethylene vinyl acetate copolymers with a vinyl acetate content of 15 to 20 wt. %, with respect to a total mass of the ethylene vinyl acetate copolymer, and a melt mass-flow rate in a range of 1.5 to 25 g/10 min (190° C., 2.16 kg),
   b) 7.5 to 20 wt. % of a combination of two different terpolymers selected such that each contains glycidyl methacrylate as a monomer in copolymerized form in a proportion from 6 to 10 wt. % with respect to the respective terpolymer and has a melting point and a melt mass-flow rate different from the other, each respective melting point being in a range of 80 to 65° C. and each said melt mass-flow rate being in a range of 2 to 15 g/10 min (190° C., 2.16 kg), wherein one of the terpolymers contains the glycidyl methacrylate, ethylene and butyl acrylate as monomers in copolymerized form and the other of the terpolymers contains the glycidyl methacrylate, ethylene and methyl acrylate as monomers in copolymerized form, wherein the terpolymer which contains the glycidyl methacrylate, ethylene and methyl acrylate as the monomers is present in an amount of 2 to 7.5 wt. %,
   c) 0.5 to 1.3 wt. % of at least one peroxide selected from the group consisting of di(tert.-butylperoxy isopropyl) benzene, dicumyl peroxide, 1,1-di-(tert.-butylperoxy)-3,3,5-trimethyl cyclohexane, 2,5-dimethyl-2,5-di(tert.-butylperoxy)hexane, dibenzoyl peroxide, and di-tert.-butyl-1,1,4,4-tetramethyl but-2-yn-1,4-ylene diperoxide, and
   d) 21 to 25 wt. %, with respect to the thermally expandable composition, of an endothermic chemical propellant which comprises a mixture of sodium hydrogen carbonate and citric acid in a weight ratio of sodium hydrogen carbonate to citric acid of 1:2 to 1:10;
   wherein the composition contains less than 0.1 wt. % of ADCA (azodicarbonamide), OBSH (4,4'-oxybis(benzenesulfonyl hydrazide)), or a mixture of ADCA (azodicarbon-amide) and OBSH (4,4'-oxybis(benzenesulfonyl hydrazide));
   wherein the thermally expandable composition expands at least 632% to 676% when heated for 25 minutes at 175° C. to obtain a foam structure that exhibits a water absorption of not more than 0.4 wt. % after 24 hours storage in water at 23° C. and subsequent storage at 23° C., 50% relative humidity for 24 hours.

15. A molded body, wherein the molded body has the thermally expandable composition of claim 14.

16. A method for sealing cavities in components against water, moisture or acoustically comprising steps of:
   a) inserting the molded body of claim 15 into a cavity of a component; and
   b) heating the molded body to a temperature above 110° C., such that the thermally expandable composition of the molded body expands and hardens thereby sealing the cavity.

17. A method for reinforcing components, comprising steps of:
   a) inserting the molded body of claim 15 into a cavity of a component or fixing said molded body to a component; and
   b) heating the molded body to a temperature above 110° C., such that the thermally expandable composition of the molded body expands and hardens thereby reinforcing the component.

18. The thermally expandable composition of claim 14, wherein the at least one peroxide comprises both 2,5-dimethyl-2,5-di(tert.-butylperoxy)hexane and di(tert.-butylperoxy isopropyl)benzene.

19. The thermally expandable composition of claim 14, additionally comprising at least one co-crosslinker selected from the group consisting of low-molecular weight multifunctional acrylates wherein the at least one co-cross-linker is present in an amount of 0.2 to 2.5 wt. %, with respect to total mass of the thermally expandable composition.

20. The thermally expandable composition of claim 19, additionally comprising 5.25 to 30 wt. % of at least one filler, 0.1 to 2.5 wt. % of at least one desiccant and 0.1 to 1.5 wt. % antioxidant.

21. The thermally expandable composition of claim 20, wherein the at least one filler comprises talcum.

22. A method for adhering movable components which comprises steps of: providing the thermally expandable composition of claim 14 between the movable components; and then heating to a temperature above 110° C., such that the thermally expandable composition expands into contact with both movable components and adheres the movable components to each other.

23. A method for reinforcing components comprising steps of: providing a component with the thermally expandable composition of claim 14; and then heating to a temperature above 110° C., such that the thermally expandable composition expands and reinforces the component.

24. A method for sealing cavities in components comprising steps of: providing the thermally expandable composition of claim 14 to the cavity of the component; and then heating to a temperature above 110° C., such that the thermally expandable composition expands and seals the cavity of the component.

* * * * *